US004001678B2

United States Statutory Invention Registration [19]

[11] Reg. Number: H1678

Ronning

[45] Published: Sep. 2, 1997

[54] ABRASIVE ARTICLE INCLUDING A POLYVINYL CARBAMATE COATING, AND METHODS FOR MAKING AND USING THE SAME

[75] Inventor: Albert James Ronning, North Oaks, Minn.

[73] Assignee: Minnesota Mining and Manufacturing Company, St. Paul, Minn.

[21] Appl. No.: 553,073

[22] Filed: Nov. 3, 1995

[51] Int. Cl.[6] ..... B24D 3/28

[52] U.S. Cl. ..... 428/141

[58] Field of Search ..... 428/143, 149; 51/298, 295

[56] References Cited

U.S. PATENT DOCUMENTS

| | | | |
|---|---|---|---|
| 1,683,623 | 9/1928 | Manley . | |
| 2,202,765 | 5/1940 | Guth . | |
| 2,532,011 | 11/1950 | Dahlquist et al. . | |
| 2,607,711 | 8/1952 | Hendricks . | |
| 2,768,886 | 10/1956 | Twombly . | |
| 2,881,064 | 4/1959 | Rankin et al. . | |
| 3,042,508 | 7/1962 | Haigis et al. . | |
| 3,043,673 | 7/1962 | Klein et al. . | |
| 3,795,496 | 3/1974 | Greenwood | 51/293 |
| 3,849,948 | 11/1974 | Steinhauser et al. | 51/406 |
| 3,869,834 | 3/1975 | Mullin et al. | 51/293 |
| 4,299,741 | 11/1981 | Doehnert | 260/29.6 |
| 4,342,815 | 8/1982 | Doehnert | 428/522 |
| 4,396,403 | 8/1983 | Ibrahim | 51/293 |
| 4,454,266 | 6/1984 | Coughlan et al. | 524/44 |
| 4,547,204 | 10/1985 | Caul | 51/298 |
| 4,652,274 | 3/1987 | Boettcher et al. | 51/298 |
| 4,720,941 | 1/1988 | Belieff et al. | 51/204 |
| 4,973,338 | 11/1990 | Gaeta et al. | 51/295 |
| 4,988,554 | 1/1991 | Peterson et al. | 428/142 |
| 5,061,294 | 10/1991 | Harmer et al. | 51/295 |
| 5,164,265 | 11/1992 | Stubbs | 428/421 |
| 5,213,589 | 5/1993 | Ronning et al. | 51/293 |
| 5,256,170 | 10/1993 | Harmer et al. | 51/293 |
| 5,378,252 | 1/1995 | Follensbee | 51/298 |

FOREIGN PATENT DOCUMENTS 0 638 392 A1 2/1995 European Pat. Off. .

*Primary Examiner*—Charles T. Jordan
*Assistant Examiner*—Meena Chelliah
*Attorney, Agent, or Firm*—Gary L. Griswold; Walter N. Kirn; Doreen S. L. Gwin

[57] ABSTRACT

An abrasive article comprising: (a) a backing having a first major surface; (b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer, and a method of making and using the abrasive article.

23 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ABRASIVE ARTICLE INCLUDING A POLYVINYL CARBAMATE COATING, AND METHODS FOR MAKING AND USING THE SAME

FIELD OF THE INVENTION

This invention relates to abrasive articles having an outermost coating layer comprising a poly(vinyl carbamate) polymer.

BACKGROUND OF THE INVENTION

Abrasive articles typically comprise a substrate or backing having on a surface thereof a plurality of abrasive particles secured thereto by a binder. Such abrasive articles are referred to as "coated abrasives." In some instances, coated abrasives include a backing, a first coating layer bonded to one side of the backing (commonly referred to as a make coating), at least one layer of abrasive particles bonded to the backing using the first coating layer, and a second coating layer overlaying the abrasive particles, which is commonly referred to as a size coating. The purpose of the size coating is to reinforce retention of the abrasive particles. In some instances, a peripheral coating is applied over the size coating, which may contain grinding aids, lubricants, and the like.

Another type of coated abrasive construction includes a backing having an abrasive composite bonded to one side of a backing. The abrasive composite includes a plurality of abrasive particles dispersed throughout a binding medium. Typically, the abrasive composite is formed from a slurry.

Coated abrasive articles. can be converted into a wide variety of different forms such as belts, discs, cones, and sheets. It is sometimes preferable to have a pressure-sensitive adhesive (PSA) coating on at least a portion of the non-abrasive side of the coated abrasive. The coated abrasive, e.g., a disc, can then be secured to a support pad and when the abrasive disc is to be replaced, it can be removed and a new abrasive disc secured to the same support pad.

One problem with packaging a plurality of coated abrasive articles each having a PSA backing is that direct contact between the abrasive surface and the PSA can facilitate transfer of the PSA to the abrasive surface, especially in the finer abrasive particle grades of coated abrasives. Consequently, this transfer may cause contamination of the abrasive coating and, therefore, the workpiece on which it is used.

Coated abrasive articles are used to abrade a wide variety of substrates, including wood, wood-like materials, plastics, fiberglass, soft metal alloys, enamel surfaces, and painted surfaces. One problem common to all of these different substrates is "loading" or clogging. Loading is the industry term that describes the phenomenon of particles from the workpiece being abraded becoming lodged in between the abrasive particles. Loading reduces the cutting ability of the abrasive article, and thus the useful life of the abrasive article is substantially reduced.

SUMMARY OF THE INVENTION

In general, the invention features an abrasive article comprising (a) a backing having a first major surface; (b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer.

In another embodiment, the invention relates to an article comprising a plurality of pressure-sensitive adhesive-backed abrasive articles, each pressure-sensitive adhesive- backed article comprising (a) a backing having a first major surface; (b) an abrasive layer coated on the first major surface, the abrasive layer comprising (i) an organic-based bond system, and (ii) a plurality of abrasive particles adhered in the bond system; (c) an outermost coating layer comprising a poly (vinyl carbamate) polymer at least partially coated over said abrasive layer; and (d) a pressure-sensitive adhesive surface coated on a second major surface of said backing opposite said first major surface; said pressure-sensitive adhesive-backed abrasive articles being relatively disposed so that at least a portion of said outermost coating layer of one pressure-sensitive adhesive-backed abrasive article contacts at least a portion of the pressure-sensitive adhesive surface of at least another underlying pressure-sensitive adhesive-backed abrasive article.

The invention also relates to a method of abrading a workpiece using an abrasive article comprising the steps of providing an abrasive article comprising (a) a backing having a first major surface; (b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer; bringing the abrasive article into forcible contact with a surface of the workpiece; and creating relative movement between the workpiece and the abrasive article.

The invention provides an abrasive article with reduced loading and reduced pressure-sensitive adhesive transfer when a pressure-sensitive adhesive backside coating is employed in the abrasive articles and when the pressure-sensitive adhesive coating of one abrasive article is temporarily adhered to the abrasive side of another abrasive article.

DETAILED DESCRIPTION OF THE INVENTION

Figure 1:
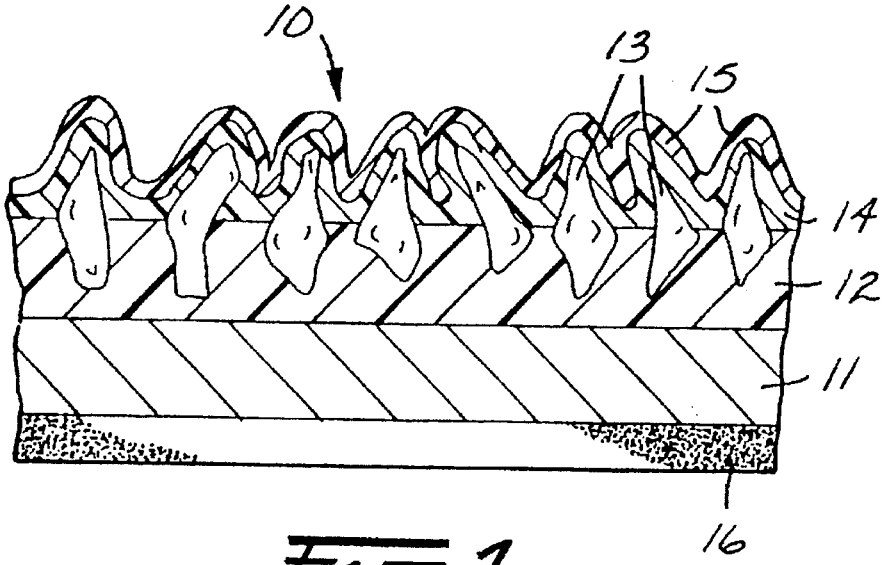
FIG. 1 is an enlarged cross-sectional view of an abrasive article according to one embodiment of the invention.

Aspects of the invention are described in more detail below.

Poly(vinyl carbamate) Polymer

The inventor has discovered that the presence of a poly (vinyl carbamate) polymer in a coating layer covering at least a portion, preferably all, of the abrasive surface of the abrasive article confers anti-loading and PSA-release properties upon the material so treated.

The poly(vinyl carbamate) polymers described in the present invention are suitable for application to a wide variety of abrasive materials or products, serving to reduce the loading of the abrading surface in use and thereby extending the working life of the material. The abrasive articles may be in the form of sheets, blocks, discs, pads, belts, and the like, or rigid or flexible 3-dimensional arrays of fibers, for example, of the type commercially available from Minnesota Mining and Manufacturing Company under the trade designation "SCOTCH-BRITE". Abrasive articles of the invention may be advantageously used in either dry or wet abrading conditions since the hardened poly(vinyl carbamate) polymer provides a degree of water repellency.

In preferred embodiments, the thickness of the coating containing the poly(vinyl carbamate) polymer is preferably no greater than about 100 micrometers, more preferably no greater than about 25 micrometers, most preferably between 0.1 and 10 micrometers. The coating weight per area typically ranges from about 5 to about 100 g/m$^2$, preferably 5 to 50 g/m$^2$. The coating weight depends, in part, on the size of the abrasive grains.

Preferred poly(vinyl carbamate) polymers include the reaction product of poly(vinyl alcohol), or a copolymer thereof (e.g., a poly(vinyl alcohol)-poly(vinyl acetate) copolymer in which the poly(vinyl alcohol) content is at least 2% by weight), and a monofunctional isocyanate having the formula R-NCO where R is an alkyl group. The alkyl group may be a branched or straight chain alkyl group having at least six carbon atoms (and preferably at least fourteen carbon atoms) in its main chain. A preferred alkyl group is an octadecyl group.

Preferred polymers are of formula (I):

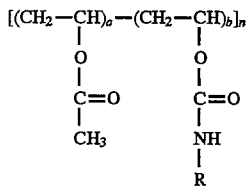

(I)

wherein "a" is the number fraction of vinyl acetate monomer units and ranges from about 0.02 to about 0.98, "b" is the number fraction of carbamate monomer units and ranges from about 0.98 to about 0.02, "n" is the degree of polymerization and ranges from about 200 to about 2,500, and R is an alkyl group, preferably an alkyl group having more than five carbon atoms in length (e.g., octadecyl), more preferably at least 14 carbon atoms. A preferred poly(vinyl carbamate) polymer is poly(vinyl N-octadecyl) carbamate.

Poly(vinyl carbamate) polymers can be prepared by reacting poly(vinyl alcohol) with an appropriate monofunctional isocyanate. Poly(vinyl alcohol) is formed commercially by hydrolyzing poly(vinyl acetate). Partially hydrolyzed, e.g., 35 to 50% hydrolyzed, poly(vinyl acetate) can be used instead of poly(vinyl alcohol) to form the carbamate polymer. Copolymers of poly(vinyl alcohol) or partially hydrolyzed acetate, containing other groups, e.g., ethylene groups, can also be used. Reaction of polymers containing some the poly(vinyl alcohol) functionality with an isocyanate results in replacement of at least some of the hydroxyl groups with carbamate groups, which form long side chains attached to carbon atoms of the extremely long linear vinyl chain. These side chains provide nitrogen-linked chains terminating with alkyl groups. The nitrogen-linked group need not be a continuous aliphatic hydrocarbon chain, and may include other atoms or radicals present in the isocyanate, provided that they do not interfere with the properties of the coating. Preferred isocyanates are alkyl monofunctional isocyanates having at least 6 carbon atoms, preferably at least 14. The greater the side chain length, the easier it is to purify the poly(vinyl carbamate) to remove substances of low molecular weight present in the reaction product, which may interfere with the properties of the coating.

Suitable poly(vinyl carbamate) polymers and a method of preparing poly (vinyl carbamates) include those described in U.S. Pat. No. 2,532,011, the disclosure of which is incorporated herein by reference. Other poly(vinyl carbamates) can be prepared by methods similar to that described in U.S. Pat. No. 2,532,011.

For example, one method is as follows: The poly(vinyl alcohol) is suspended in xylene in a flask provided with a reflux condenser and water trap (the amount of xylene should be about three times the combined weight of poly (vinyl alcohol) and octadecyl isocyanate to be used). Moisture in the poly(vinyl alcohol) is removed by refluxing for half an hour. The octadecyl isocyanate is then added in an amount equal to about 110% of the theoretical maximum requirement (which depends on the hydroxyl content of the poly(vinyl alcohol)), thus, 100 parts by weight of 85% hydrolyzed poly(vinyl acetate) will need about 550 parts of the octadecyl isocyanate). Refluxing is continued and the progress of the reaction can be judged by the apparent disappearance of the poly(vinyl alcohol), which is an insoluble suspension, the reaction product being soluble in xylene. Two or more hours of refluxing may be employed to insure complete reaction. The reaction mixture is then allowed to cool below 100° C. and is poured into an equal volume of hot isopropanol (isopropyl alcohol), and the mixture is heated to boiling. A volume of methanol (methyl alcohol), equal to the combined volume of the reaction mixture and isopropanol, is then added to precipitate the poly(vinyl-N-octadecyl carbamate). The precipitate is removed and is then dispersed in an amount of fresh isopropanol equal to the amount used in the first purification, which is effected by heating to the boiling point and stirring. An equal volume of methanol is again added to precipitate the poly(vinyl-N-octadecyl carbamate), which is then removed and dried. The purification procedure may be repeated one or more additional times, but this is generally unnecessary, and yields of 90% can be obtained.

Poly(vinyl carbamate) polymers are also commercially available from Aceto Chemical Co., under the trade designation "PEEL-OIL," and from Andersion Development Co., under the trade designation "ESCOAT".

Most poly(vinyl carbamate) polymers are thermoplastic materials, that is to say, they are rendered soft and moldable by heat, can be dissolved in a solvent solution and hardened by evaporation of the solvent, and are not hardened by cross-linking or polymerization. However, poly(vinyl carbamate) polymers containing residual hydroxyl groups can be chemically crosslinked to increase heat resistance, e.g., by reacting the polymer with a small amount of a di-isocyanate.

The poly(vinyl carbamate) coating composition may contain other ingredients as well, e.g., fillers such as pigments, suspending agents, and the like.

When it is desired to utilize an article from which sheet-like segments of PSA adhesive-backed coated abrasives can be removed, wherein each segment has an abrasive front surface and a PSA-coated backside surface (e.g., such as the article described in U.S. Pat. No. 3,849,949, hereby incorporated by reference), the poly(vinyl carbamate) polymers described herein may reduce the amount of PSA transfer to the abrasive front surface of an adjacent coated abrasive. The poly(vinyl carbamate) polymers may also reduce the force required to unwind a roll of such coated abrasive. The choice of the particular poly(vinyl carbamate) employed and the thickness of the binder layer containing said polymer are functions of the particular PSA employed, the temperature the article is experiencing or will experience, humidity, and the degree to which adhesive transfer is to be reduced. It has been found that the poly(vinyl carbamate) and PSA should be chosen such that the initial 180° peel strength of the bond between a poly(vinyl carbamate)-coated abrasive surface and a PSA is less than about 10.0 gm/cm, preferably less than about 4.0 gm/cm, but in all cases more than about 0.1 gm/cm. The 180° peel strength of the bond can be measured according to a standardized test as discussed infra.

Pressure-sensitive Adhesives

A wide variety of PSAs may be used with the poly(vinyl carbamate)-containing abrasive articles of the present invention. Suitable PSAs include PSAs having 180° peel adhesion ranging from about 170 to about 1000 gm/cm, more preferably ranging from about 390 to about 560 gm/cm. The 180° peel adhesion can be measured using the test procedure outlined in the Examples section below using a standard glass substrate.

The internal cohesive strength (shear strength) of the PSA can range from about 1 minute to over 10,000 minutes.

The shear strength is a measure of the cohesiveness or internal strength of an adhesive. It is based upon the amount of force required to pull an adhesive strip from a standard flat surface in a direction parallel to the surface to which it has been affixed with a definite pressure. Shear strength is measured in terms of time (in minutes) required to pull a standard area of adhesive coated sheet material from a stainless steel test panel under stress of a constant, standard load.

Shear stress may be tested by applying PSA coated strips to a stainless steel panel such that a 12.5 mm by 12.5 mm portion of each strip is in firm contact with the panel, with one end portion of the strip being free. The panel with the coated strip attached is held in a rack such that the panel forms an angle of 178° with the extended strip free end. The free end is then tensioned by application of a force of one kilogram, applied as a hanging weight from the free end of the coated strip. The time elapsed for each strip to separate from the test panel is recorded as the shear strength.

PSAs useful in the structures of the present invention are known in the art and are compositions which may include one or more of latex crepe, rosin, isobutylene polymers, cumarone resins, acrylic-based copolymers, vinyl ethers, alkyl adhesives, rubber adhesives based on rubbers such as natural rubber, synthetic rubbers, and chlorinated rubbers, polyisobutylene, polyvinyl isopropylene, poly (butylacrylate), poly(vinyl n-butyl ether), and poly(acrylate) esters and mixtures thereof. Because of their extended shelf life and resistance to detackifying under atmospheric conditions, acrylic-based copolymer adhesives are preferred. Acrylic-based copolymer adhesives are disclosed in U.S. Pat. No. Re. 24,906, the disclosure of which is incorporated herein by reference. One example of such an acrylic-based copolymer is an isooctylacrylatelacrylic acid copolymer having a ratio of 95:5:4.5, respectively. Other preferred adhesives are a terpolymer of ethyl acrylate, butyl acrylate, and acrylic acid having a ratio of 68:26:6, respectively; a copolymer of isooctylacrylate and acrylamide having a ratio of 96:4 respectively; and a terpolymer of isooctylacrylate, vinylacetate, and acrylic acid with a ratio of 56:40:4, respectively (all ratios are measured in parts by weight). Such acrylic PSAs can be coated on the back side of a sheetlike coated abrasive out of a solution of heptane:isopropanol solvent, and the heptane: isopropanol solvent subsequently evaporated, leaving a pressure-sensitive adhesive coating or the PSA can be hot melt extrusion coated.

Abrasive Articles

Abrasive articles generally comprise abrasive grains secured within a binder. In a bonded abrasive, the binder bonds the abrasive grains together in a shaped mass. Typically, this shaped mass is in the form of a wheel and thus it is commonly referred to as a grinding wheel. In nonwoven abrasives, the binder bonds the abrasive grains to a lofty, open, fibrous substrate. In coated abrasives, the binder bonds the abrasive grains to a substrate or backing.

Abrasive articles of this invention can include coated, nonwoven, and bonded abrasive articles and can have a variety of forms such as sheet-like segments and discs.

The bond system of the abrasive articles of this invention is an organic-based bond system which can comprise, for example, at least two adhesive layers, the first of which will be referred to hereafter as the "make coating" and the second of which will be referred to as the "size coating."

Alternatively, the abrasive layer can comprise an abrasive composite comprising a binder with abrasive particles adhered therein, which is formed by curing an abrasive slurry comprising a binder precursor and abrasive particles or a mixture of different abrasive particles. The abrasive slurry is preferably homogenous.

Typically, the make and the size coat are formed from organic-based binder precursors, for example, resins. The precursors used to form the make coat may be the same or different from those used to form the size coat. Upon exposure to the proper conditions, such as an appropriate energy source, the resin polymerizes to form a cross-linked thermoset polymer or binder. Examples of typical resinous adhesives include phenolic resins, aminoplast resins having pendant alpha, beta, unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorine modified epoxy resins, and mixtures thereof. Epoxy resins and phenolic resins are preferred.

Phenolic resins are widely used as binder precursors because of their thermal properties, availability, cost, and ease of handling. Phenolic resins of the phenol-aldehyde type are preferred. The monomers currently used in greatest volume to produce phenolic resin are phenol and formaldehyde. Other important phenolic starting materials are the alkyl-substituted phenols, including cresols, xylenols, p-tert-butyl-phenol, p-phenylphenol, and nonylphenol. Diphenols, for example, resorcinol (1,3-benzene diol) and bisphenol-A, are employed in smaller quantities for applications requiring special properties. Examples of commercially available phenolic resins include those available from Occidental Chemicals Corp under the trade designations "Durez" and "Varcum"; those available from Monsanto under the trade designation "Resinox"; and those available from available from Ashland Chemical Co. under the trade designations "Arofene" and "Arotap".

Aminoplast resins typically have at least one pendant alpha, beta-unsaturated carbonyl group per molecule or oligomer. Useful aminoplast resins include those described in U.S. Pat. Nos. 4,903,440 and 5,236,472 which are incorporated herein by reference.

Epoxy resins have an oxirane ring and are polymerized by the ring opening. Suitable epoxy resins include monomeric epoxy resins and polymeric epoxy resins and can have varying backbones and substituent groups. In general, the backbone may be of any type normally associated with epoxy resins, for example, Bis-phenol A, and the substituent groups can include any group free of an active hydrogen atom that is reactive with an oxirane ring at room temperature. Representative examples of suitable substituent groups include halogens, ester groups, ether groups, sulfonate groups, siloxane groups, nitro groups and phosphate groups.

Examples of preferred epoxy resins include 2,2-bis[4-(2,3-epoxypropoxy)-phenyl]propane (a diglycidyl ether of bisphenol) and commercially available materials under the trade designation "Epon 828", "Epon 1004", and "Epon 1001F" available from Shell Chemical Co., and "DER-331 ", "DER-332" and "DER-334" available from Dow Chemical Co. Other suitable epoxy resins include glycidyl ethers of phenol formaldehyde novolac, for example, "DEN-431" and "DEN-428" available from Dow Chemical Co.

Ethylenically unsaturated resins include both monomeric and polymeric compounds that contain atoms of carbon, hydrogen, and oxygen, and optionally, nitrogen and halogen atoms. Oxygen or nitrogen atoms or both are generally present in ether, ester, urethane, amide, and urea groups. Ethylenically unsaturated compounds preferably have a molecular weight of less than about 4,000, and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, and maleic acid.

Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate.

Other ethylenically unsaturated resins include monoallyl, polyallyl, and polymethallyl esters and amides of carboxylic acids, such as diallyl phthalate, diallyl adipate, and N,N-diallyladkipamide. Other suitable nitrogen-containing compounds include tris(2-acryloyloxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Acrylated urethanes are diacrylate esters of hydroxy terminated NCO extended polyesters or polyethers. Examples of commercially available acrylated urethanes include "Uvithane 782", available from Morton Thiokol Chemical, and "CMD 6600," "CMD 8400," and "CMD 8805," available from Radcure Specialties.

Acrylated epoxies are diacrylate esters of epoxy resins, such as the diacrylate esters of bisphenol A epoxy resin. Examples of commercially available acrylated epoxies include "CMD 3500," "CMD 3600," and "CMD 3700," available from Radcure Specialties.

The bond system, for example, the make and/or size coat, of this invention can further comprise optional additives, such as, for example, fillers (including grinding aids), fibers, antistatic agents, lubricants, wetting agents, surfactants, pigments, dyes, coupling agents, plasticizers, and suspending agents. The amounts of these materials can be selected to provide the properties desired.

Plasticizers, crosslinking aids, and reactive diluents as disclosed in U.S. Pat. No. 5,178,646, hereby incorporated by reference herein, can be used.

Fillers can be selected from any filler material that does not adversely affect the characteristics of the bond system. Preferred fillers include calcium carbonate, calcium oxide, calcium metasilicate, aluminum sulfate, alumina trihydrate, cryolite, magnesium, kaolin, quartz, and glass. Fillers can be used in varying amounts, provided that the abrasive article retains acceptable mechanical properties (such as flexibility and toughness).

The abrasive layer can comprise a peripheral coating layer. For example, if the bond system comprises a make coat and a size coat, the peripheral coating layer, also known as a supersize coating, can be coated over the size coat or the peripheral coating layer can be coated over an abrasive composite formed from an abrasive slurry. The peripheral coating layer can be formed from an organic-based binder precursor, for example, resins, as described for the make and size coats and can comprise a grinding aid. Suitable grinding aids include those described above for the bond system. For example, a peripheral coating layer can comprise potassium tetrafluoroborate particles distributed throughout a cross-linked epoxy resin. The peripheral coating layer is usually roll or spray coated onto the cured size coat or composite and, thus, is cured separately from the size coat/abrasive slurry.

Backings useful in the present invention include flexible backings upon which an abrasive coating comprising abrasive particles and the binder are attached. The backing can be selected from paper, cloth, film, vulcanized fiber, and the like or a combination of one or more of these materials, or treated versions thereof. The preferred backing is a flexible polyester film that has had a primer applied between the polyester film and binding medium, such as ethylene/acrylic acid copolymer primer. If a PSA is to be applied to the backside of the polyester film, an aziridine-containing compound is preferably applied between the backside of the polyester film and the PSA, e.g., a coating as disclosed in col. 4 of U.S. Pat. No. 4,749,617, the disclosure of which is incorporated by reference herein.

Alternatively, the backing may be a nonwoven comprising a lofty, open, fibrous mat of fibers where the fibers can comprise various polymers, including poly(amides), poly (esters), poly(propylene), poly(ethylene), and various copolymers. Naturally occurring fibers such as cotton, wool, bast fibers and various other fibers may also be used.

The abrasive particles can be any conventional grade utilized in the formation of abrasive articles, and can be, for example, flint, garnet, aluminum oxide, ceramic aluminum oxide, alumina zirconia (including fused alumina zirconia such as disclosed in U.S. Pat. Nos. 3,781,172, 3,891,408, and 3,893,826, commercially available from the Norton Company of Worcester, Mass., under the trade designation "NorZon"), diamond, silicon carbide (including refractory coated silicon carbide such as disclosed in U.S. Pat. No. 4,505,720), alpha alumina-based ceramic material (available from Minnesota Mining and Manufacturing Company under the trade designation "Cubitron") as disclosed in U.S. Pat. Nos. 4,314,827, 4,518,397, 4,574,003, and 4,774,802, or mixtures thereof. The abrasive particles can be individual abrasive grains or particles comprising a plurality of abrasive grains in a binder. Moreover, they can be irregularly or regularly shaped, such as disclosed in U.S. Pat. No. 5,201,916. The concentration of the abrasive particles can be varied according to the end use of the abrasive article. The abrasive particles can be oriented or can be applied to the backing without orientation, depending upon the requirements of the particular abrasive article. The average diameter of the abrasive particles typically ranges from about 3 to about 1000 micrometers, more preferably from about 3 to about 100 micrometers. The poly(vinyl carbamate)-containing binders are especially useful with lower average particle diameter abrasives such as 3–15 micrometers. Non-abrasive or less abrasive diluent grains may be incorporated, as disclosed in assignee's U.S. Pat. No. 5,011,512, incorporated herein by reference.

When the coated abrasive articles are discs or sheets, the coated abrasive articles can be packaged in a manner such that at least a portion of the poly(vinyl carbamate) coating of a first coated abrasive article contacts at least a portion of the PSA coating of a second article. In the case of a continuous roll of coated abrasive, at least a portion of the poly(vinyl carbamate) coating of a first portion of the roll is in direct contact with at least a portion of the PSA layer of a second portion of the roll.

Aging studies have shown that adhesion strength of an acrylate adhesive to abrasive particles increased with time so as to cause adhesive transfer to the abrasive particles when unwinding the roll for use. In analyzing this problem, it became apparent that initial and aged peel strength of the PSA, surface release properties of the mineral top size surface, and PSA internal cohesive strength were all important performance considerations. For example, a lower peel strength PSA can strip cleanly off a surface if its internal cohesive strength prevents splitting and transfer of adhesive to the surface at that "peel" value. The reasoning indicates that a higher "shear" (internal cohesion strength) PSA will strip off cleanly from a higher peel surface as long as its "splitting threshold" is higher than the aged peel value. Further, initial peel strength values may be important to the user. PSAs having lower initial adhesion, and which increase in adhesion as a function of dwell time less than other PSAs (other parameters being equal) will give less adhesive transfer on a packaged roll which is "aging" while awaiting use.

Articles in accordance with the invention may be formed from a plurality of abrasive articles such as sheet-like segments of pressure-sensitive adhesive-backed coated abrasive. In articles in accordance with the invention, sheet-like segments, preferably of pressure-sensitive adhesive-backed coated abrasive, can be removed, for example, by pulling a first segment of pressure-sensitive adhesive-backed coated abrasive having its abrasive front surface temporarily adhered to the adhesive surface of another segment of pressure-sensitive adhesive-backed coated abrasive in such a manner that the segments will separate. One or more of the pressure-sensitive adhesive-backed abrasive articles may be mounted on a support member, for example, a support pad.

Referring now to FIG. 1, an enlarged cross-sectional view of one preferred abrasive article embodiment in accordance with the invention is illustrated. Coated abrasive article 10 includes a flexible backing 11 such as a polyester film, onto which is coated a make coating 12 proximal to the backing. Embedded in make coating 12 are a plurality of abrasive particles 13 such as silicon carbide or aluminum oxide abrasive particles. Over the abrasive particles is coated a size coating 14, distal from the backing, and a poly(vinyl carbamate) polymer coating 15 is in turn coated over the size coating. A layer 16 of PSA is coated onto the side opposite of the poly(vinyl carbamate) coating 15. Layer 16 must have sufficient adhesive strength to secure the coated abrasive to a backup pad during use. For example, a typical coated abrasive disc/backup pad may spin at a rate as high as 14,000 revolutions per minute in actual operation.

Figure 2:
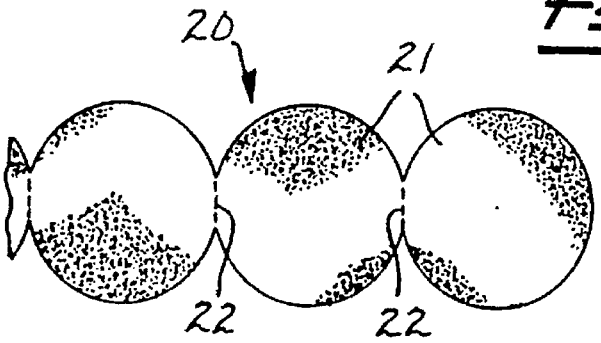
FIG. 2 is a reduced plan view of a portion of a concatenate of abrasive discs.

FIG. 2 shows a plan view (reduced) of a preferred abrasive article of the invention, a concatenation 20 of edge-connected coated abrasive discs 21 capable of being convolutely wound to form a roll which can be easily unrolled. Alternately, other shapes of coated abrasive can be used. A concatenation of coated abrasive is more fully described in assignee's U.S. Pat. No. 3,849,949, incorporated herein by reference. Each disc 21 preferably has a structure as shown in cross-section in FIG. 1 and is joined to at least one other similarly constructed disc 21 along a straight edge 22 of the disc formed by removal of a small segment defined by a chord having a length less than ½ the radius of the disc. Straight edge 22 is preferably perforated for easy separation of the discs along the chord. This concatenation 20 of coated abrasive discs, when wound into a roll, has the poly(vinyl carbamate) size or peripheral coating of one disc 21 in direct, releasable contact with the PSA on the back side of another disc 21 when the concatenation is convolutely wound. There is no release liner required with packaged coated abrasives of this type. The discs can be easily separated from one another when desired.

Figure 3:
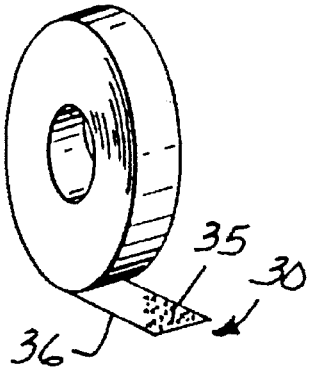
FIG. 3 is a greatly reduced perspective view of a roll of coated abrasive material.

FIG. 3 shows a reduced perspective view of another preferred article of the invention, a packaged roll 30 of coated abrasive employing a poly(vinyl carbamate) coating. Roll 30 comprises an elongated sheet of coated abrasive material of the type shown in cross-section in either FIG. 1 or 4. The materials of construction suitable for roll 30 can be the same as those used in aforementioned coated abrasive article 10. In FIG. 3, it can be seen that when the coated abrasive material is wound into a roll, the poly(vinyl carbamate) coating 35 will be in direct, releasable contact with a layer of PSA 36. When the user desires to remove a piece of coated abrasive material from roll 30, the user merely unwinds a portion of roll 30 and cuts or tears this portion from the roll. The poly(vinyl carbamate) coating functions as a release coating, substantially reduces the transfer of PSA to the abrasive particles, reduces the force required to unwind the roll, and reduces loading of the abrasive article.

Figure 4:
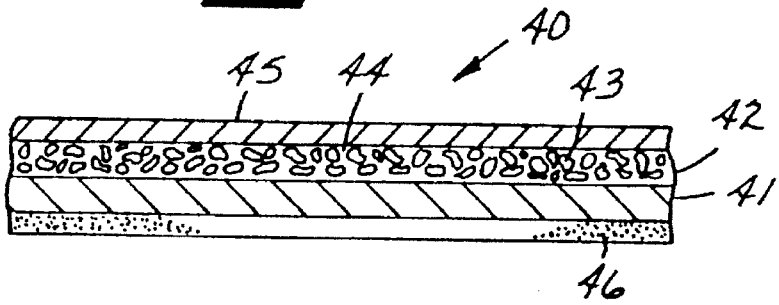
FIG. 4 is an enlarged cross-sectional view of an abrasive article according to another embodiment of the invention.

FIG. 4 shows an enlarged cross-section of another embodiment of a coated abrasive in accordance with the invention. The coated abrasive 40 comprises a backing 41 and an abrasive coating 42 bonded to the backing. Abrasive coating 42 comprises a plurality of abrasive particles 43 dispersed in a binder 44. In this embodiment, the abrasive coating is formed from a slurry. The outermost layer of the coated abrasive article is a poly(vinyl carbamate) coating layer 45. A PSA coating 46 is present on the side of the backing opposite the abrasive composite.

The followed description is a preferred but not exclusive method of making a coated abrasive. This preferred method is described with reference to a bond system comprising a make and size coat and a backing comprising a first major surface. However, the method may also include applying an abrasive slurry to a first major surface of a backing, where the abrasive slurry comprises a plurality of abrasive particles and a binder precursor, each as described above, and exposing the slurry to conditions which solidify the binder precursor and form an abrasive layer.

A make coat comprising a first organic-based binder precursor can be applied to the first major surface of a backing by any suitable technique such as spray coating, roll coating, die coating, powder coating, hot melt coating or knife coating. Abrasive particles can be projected on and o adhered in the make coat precursor, i.e., distributed in the make coat precursor. Typically, the abrasive particles are drop coated to preferably achieve a monolayer. The make coat should not be of a thickness which would wick up one layer of abrasive particles and bond a second layer. In addition, the abrasive particles preferably are uniformly distributed.

The resulting construction is then exposed to a first energy source, such as heat, ultra-violet source, or electron beam, to at least partially cure the first binder precursor to form a make coat that does not flow. For example, the resulting construction can be exposed to heat at a temperature between 50° to 130° C., preferably 80° to 110° C., for a period of time ranging from 30 minutes to 3 hours. Following this, a size coat comprising a second organic-based binder precursor, which may be the same or different from the first organic-based binder precursor, is applied over the abrasive particles by any conventional technique, for example, by spray coating, roll coating, and curtain coating. Finally, the resulting abrasive construction is exposed to a second energy sourca, such as heat, an ultra-violet source, or electron beam, which may be the same or different from the first energy source, to completely cure or polymerize the make coat and the second binder precursor into thermosetting polymers.

A poly(vinyl carbamate) composition can be applied over at least a portion, preferably all, of the size coating, peripheral coating, or abrasive composite so that the poly(vinyl carbamate) composition is the outermost coating of the abrasive article. The poly(vinyl carbamate) composition is then dried, e.g., by heating, typically at a temperature ranging from 50° to 130° C., preferably 50° to 80° C. Optionally, a pressure-sensitive adhesive is applied to a second major surface of the backing opposite the first major surface. The thickness of the poly(vinyl carbamate) layer is chosen to substantially reduce adhesive transfer. The typical thickness of the poly(vinyl carbamate) layer is no greater than 100 micrometers, preferably no greater than 25 micrometers, and more preferably between 0.1 and 10 micrometers.

The poly(vinyl carbamate) compositions may be applied by most standard coating techniques, either as dilute solutions in organic solvents or as neat liquids. Suitable solvents include but are not limited to volatile organic liquids which will dissolve the poly(vinyl carbamate) polymer, for example, selected from the group consisting of alkanes, arenes, chlorinated hydrocarbons, lower alkanols, and mixtures thereof. If a solvent is utilized, the composition may be included in the solvent at a concentration as low as about 2% solids.

A method of abrading a workpiece using an abrasive article is also presented, the method including creating relative movement between the abrasive article and a workpiece while the workpiece and the abrasive article are touching. The method uses an abrasive article as described above in accordance with the invention, having an outermost poly(vinyl carbamate) coating, so that the poly(vinyl carbamate) substantially reduces adhesive transfer. The abrasive article preferably includes a pressure-sensitive adhesive layer on at least a portion of a second major surface of the backing opposite the first major surface so that the article may be attached to a tool, such as a rotary sander or belt sander.

The invention will be further described with reference to the following test methods and examples, wherein all pads and percentages are by weight unless otherwise stated.

EXAMPLES

180° Peel Adhesion Test Procedure:

The 180° Peel Adhesion Test is a procedure used to measure the force necessary to remove (i.e. peel) a PSA-coated substrate from a test substrate.

The general test procedure encompasses cleaning a standard glass plate (10.2 cm×30.5 cm) using one wash of diacetone alcohol followed by three washes of n-heptane. With very light tension, a sample of coated abrasive (2.5 cm×40 cm) having a PSA-backsize coating is then applied alone the center of the standard glass plate, PSA side down. The sample is then rolled once with a 2.04 Kg hand roller. The standard glass plate is then secured to a horizontal platen in a standard peel adhesion tester known under the trade designation "IMASS." One end of the sample is then attached to a hook which is a part of the peel adhesion tester. The sample is peeled from the standard glass plate at a 180 angle (i.e., one end of the sample is pulled toward the other end) by moving the platen horizontally at a speed of 228.6 cm/min(90 in/min), and the force required is recorded, in gm/cm of sample width, for various dwell times.

Sample Testing:

To compare peel adhesion results of coated abrasives having a poly(vinyl cerbamate) coating layer with coated abrasives lacking such a coating layer, the test procedure above is used except that, instead of the standard glass substrate, the following substrates were used to prepare the test samples:

Coated Abrasive A containing abrasive particles having an average particle size of 30 micrometers, Coated Abrasive B containing abrasive particles having an average particle size of 15 micrometers, and Coated Abrasive C containing abrasive particles having an average particle size of 9 micrometers.

Each coated abrasive used was a commercially available microfinishing film known under the trade designation "Imperial", available from Minnesota Mining and Manufacturing Company, St. Paul, Minn. The coated abrasive contained a pressure-sensitive adhesive on a side of the backing opposite the abrasive material, and did not contain a supersize coating. The coated abrasives used to prepare the test samples, i.e., Examples 1 to 3 and Comparative Examples A, B, and C, are set forth in Table 1.

TABLE 1

Preparation of Examples 1 to 3 and Comparative Examples A, B, and C

| Example | Coated Abrasive |
|---|---|
| Example 1 | C |
| Example 2 | B |
| Example 3 | A |
| Comparative Example A | C |
| Comparative Example B | B |
| Comparative Example C | A |

A poly(vinyl N-octadecyl) carbamate polymer in toluene (5% solids) was coated onto the abrasive surface of each of the respective coated abrasives used to prepare Examples 1 to 3. The coating was applied by a two roll coating method in which a web of coated abrasive was passed between one steel roll and one rubber roll. The rubber roll applied the coating solution from a pan located below the web to the web. The coating was then dried at 250° F. (121° C.) for 10 minutes; the resulting coating thickness was estimated to be 3000 to 6000 Angstroms, i.e., 0.3 to 0.6 micrometers (μm).

The results of the 180 peel adhesion test are set forth in Table 2.

TABLE 2

180° Peel Adhesion Test Results

| Example | Force (g/cm) |
|---|---|
| Example 1 | 22 |
| Example 2 | 11 |
| Example 3 | 1.1 |
| Comparative Example A | 385 |
| Comparative Example B | 198 |
| Comparative Example C | 66 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprising:

(a) a backing having a first major surface;

(b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer.

2. The abrasive article of claim 1 wherein said bond system comprises a make coating and a size coating.

3. The abrasive article of claim 2 wherein said abrasive layer further comprises a peripheral coating positioned on the size coating.

4. The abrasive article of claim 1 wherein said abrasive layer comprises an abrasive composite.

5. The abrasive article of claim 4 wherein said abrasive layer further comprises a peripheral coating positioned on the abrasive composite.

6. The abrasive article of claim 1 wherein said outermost coating layer comprising said poly(vinyl carbamate) polymer has a thickness no greater than about 100 μm.

7. The abrasive article of claim 6 wherein the thickness is no greater than about 25 μm.

8. The abrasive article of claim 6 wherein the thickness is between 0.1 and 1.0 μm.

9. The abrasive article of claim 1 wherein said poly(vinyl carbamate) polymer is the reaction product of poly(vinyl alcohol), or a copolymer thereof, and a monofunctional isocyanate having the formula R-NCO wherein R is an alkyl group.

10. The abrasive article of claim 9 wherein said alkyl group is a branched or straight chain alkyl group having at least six carbon atoms in its main chain.

11. The abrasive article of claim 9 wherein said alkyl group is a branched or straight chain alkyl group having at least fourteen carbon atoms in its main chain.

12. The abrasive article of claim 9 wherein R is an octadecyl group.

13. The abrasive article of claim 9 wherein said poly(vinyl alcohol) comprises a poly(vinyl alcohol)-poly(vinyl acetate) copolymer having a poly(vinyl alcohol) content of at least 2% by weight.

14. The abrasive article of claim 1 wherein said poly(vinyl carbamate) polymer comprises a polymer of formula (I):

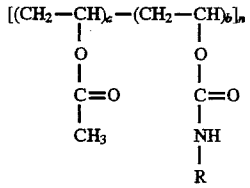

(I)

wherein a is a number fraction of vinyl acetate monomer units and ranges from about 0.02 to about 0.98, b is a number fraction of carbamate monomer units and ranges from about 0.98 to about 0.02, n is a degree of polymerization and ranges from about 200 to about 2,500, and R is an alkyl group.

15. The abrasive article of claim 14 wherein R is an octadecyl group.

16. The abrasive article of claim 1 further comprising a pressure-sensitive adhesive layer coated on a second major surface of said backing opposite said first major surface.

17. The abrasive article of claim 16 wherein said pressure-sensitive adhesive comprises an adhesive selected from the group consisting of latex crepe, rosin, isobutylene polymers, cumarone resins, acrylic-based copolymers, vinyl ethers, alkyl adhesives, polyacrylate esters, poly(isobutylene), poly (vinyl isopropylene), poly(butylacrylate), poly(vinyl n-butyl ether), and natural and synthetic rubber based adhesives.

18. An abrasive article of claim 17 wherein said pressure-sensitive adhesive is an acrylic-based copolymer.

19. An article comprising a plurality of pressure-sensitive adhesive-backed abrasive articles, each pressure-sensitive adhesive-backed article comprising (a) a backing having a first major surface;

(b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer (d) a pressure-sensitive adhesive surface coated on a second major surface of said backing opposite said first major surface, said pressure-sensitive adhesive-backed abrasive articles being relatively disposed so that at least a portion of said outermost coating layer of one pressure-sensitive adhesive-backed abrasive article contacts at least a portion of the pressure-sensitive adhesive surface of at least another underlying pressure-sensitive adhesive-backed abrasive article.

20. The article of claim 19 wherein the plurality of pressure-sensitive adhesive-backed abrasive articles are disposed in the form of a stack.

21. The article of claim 19 wherein the plurality of pressure-sensitive adhesive-backed abrasive articles are disposed in the form of a roll.

22. The article of claim 19 further comprising a support member upon which is mounted one or more of said plurality of pressure-sensitive adhesive-backed abrasive articles.

23. A method of abrading a workpiece using an abrasive article comprising the steps of:

providing an abrasive article comprising (a) a backing having a first major surface; (b) an abrasive layer coated on the first major surface, the abrasive layer comprising (i) an organic-based bond system, and (ii) a plurality of abrasive particles adhered in the bond system; and (c) an outermost coating layer comprising a poly(vinyl carbamate) polymer at least partially coated over said abrasive layer;

bringing the abrasive article into forcible contact with a surface of the workpiece; and creating relative movement between the workpiece and the abrasive article.

* * * * *